United States Patent [19]

Sweeney

[11] Patent Number: 5,702,149
[45] Date of Patent: Dec. 30, 1997

[54] APPARATUS FOR THE DEFLECTING OF WIND

[76] Inventor: Daniel F. Sweeney, 39439 E. Archer, Harrison Township, Mich. 48045

[21] Appl. No.: 613,513

[22] Filed: Mar. 11, 1996

[51] Int. Cl.⁶ .................................................. B60J 1/20
[52] U.S. Cl. ................................. 296/152; 454/131
[58] Field of Search ............................ 296/152, 154, 296/180.1, 97.1, 97.7, 97.9; 454/84, 86, 95, 96, 97, 128, 131, 135

[56] References Cited

U.S. PATENT DOCUMENTS

| | | | |
|---|---|---|---|
| 1,891,390 | 12/1932 | Liebig | 454/135 |
| 1,917,093 | 7/1933 | Cameron | 454/135 |
| 2,070,502 | 2/1937 | Woina | 454/135 |
| 4,089,256 | 5/1978 | Furcini | 454/128 |
| 5,044,685 | 9/1991 | Yang | 296/97.7 X |

FOREIGN PATENT DOCUMENTS

| | | | |
|---|---|---|---|
| 2202836 | 7/1973 | Germany | 454/131 |

*Primary Examiner*—Andrew C. Pike
*Attorney, Agent, or Firm*—Thomas E. Lynch

[57] ABSTRACT

A removable pocket wind deflector is provided for the side window of a vehicle wherein the main portion of the wind deflector is a relatively flat, relatively rigid piece of plastic having a quadrilateral shape with a height and a width, and the secondary end piece of the wind deflector is of generally soft or flexible plastic with a generally triangular shape. The triangular end piece is bonded along its height edge to one side of the main portion of the wind deflector along its height. The top edge of the main portion of the wind deflector and the outside edge of the flexible end piece have two-piece thistle and hook fasteners for attaching the wind deflector to the top rear of the side window frame forming a pocket for redirecting the wind back out of the vehicle when it is moving and the window is open. The wind deflector does not extend the full height of the window so that the operator or the passenger can extend an arm or elbow out of the vehicle. The wind deflector can be of tinted, polarized, or photosensitive material so that it can also act as a sun or glare shield.

19 Claims, 4 Drawing Sheets

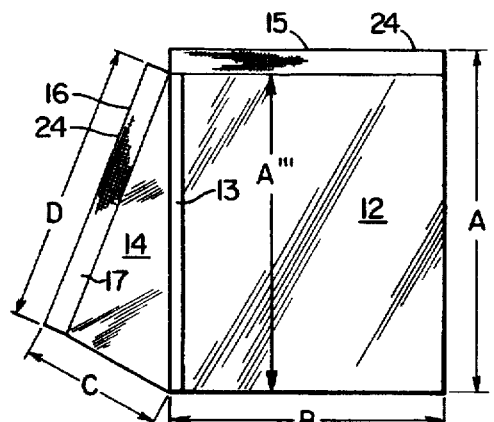
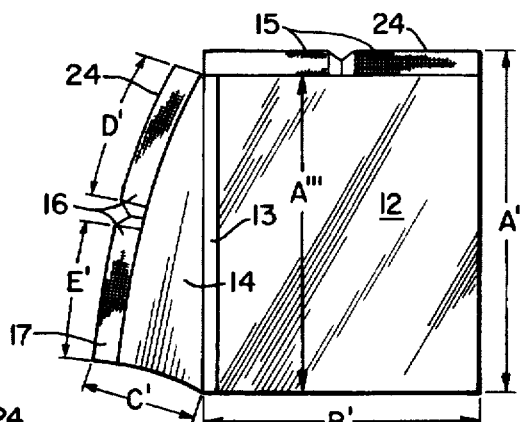
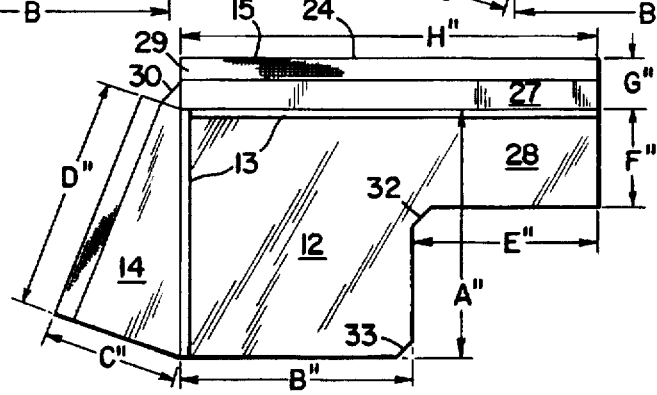
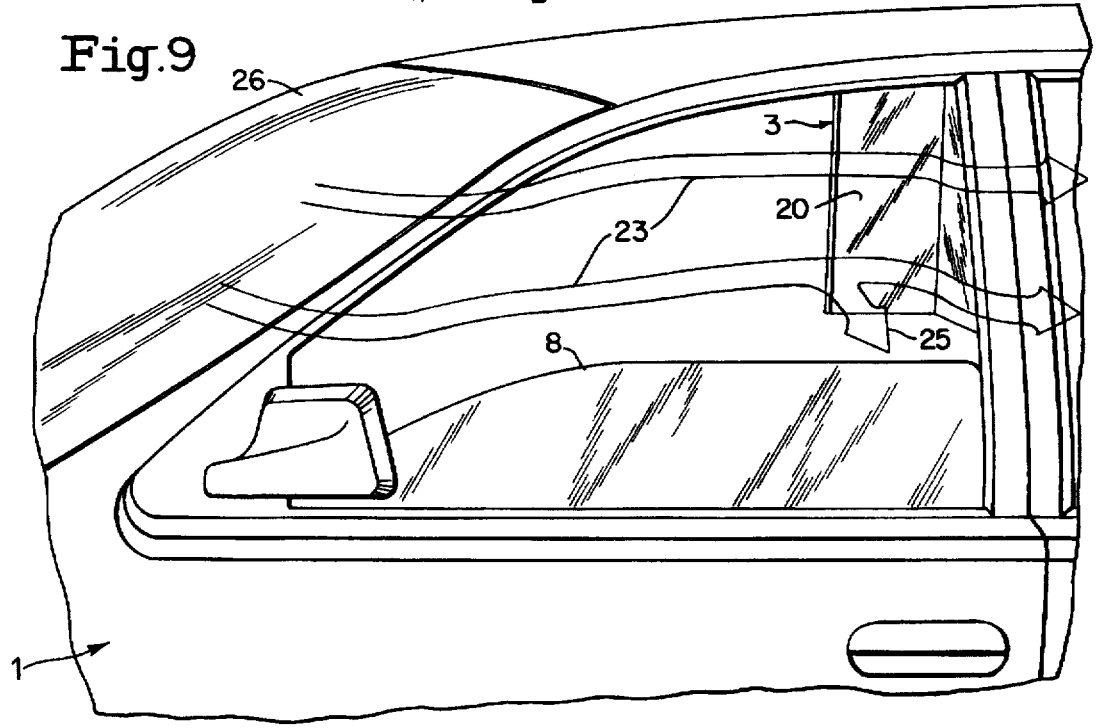

APPARATUS FOR THE DEFLECTING OF WIND

Be it known that I, Daniel F. Sweeney, a citizen of the United States, whose Post Office address is: 39439 E. Archer Drive, Harrison Township, Mich. 48045, have invented a new, useful and unobvious apparatus for the deflecting of wind, drafts, rain, snow, dirt, dust and/or insects from the interior of a moving vehicle, as fully disclosed and described below.

BACKGROUND OF THE INVENTION

1. Field of Invention

The present invention pertains to a removable apparatus for facilitating the elimination of wind, rain, snow, drafts, dirt, dust, and/or insects from entering the open side window of a moving vehicle, more particularly, by deflecting them in a unique and unobvious way whereby prior art wind deflectors are rendered obsolete. Thus, my wind deflector increases the efficiency of wind deflection, while at the same time the cost of my deflector is significantly decreased over those of the prior art. Moreover, my wind deflector can be either permanently or removably installed at the convenience of the vehicle operator, and it can also be provided in kit form for easy aftermarket installation on existing vehicles with inadequate wind deflection presently installed. After installation, my wind deflector can be easily removed during the winter months or during inclement weather at the convenience of the operator.

My wind deflector is mounted on the interior of the vehicle window frame, and thus, does not extend outside the vehicle profile at any point. Therefore, it does not interfere with the outer streamlining of the vehicle, it does not provide a risk of hitting anything or of being knocked loose by anything passing close to the side of the vehicle, nor can it be easily stolen unless the vehicle window is broken and the vehicle door is opened. Also, since it is mounted on the inside of the window frame, my wind deflector does not allow easy access by thieves to the inside of the vehicle such as often happened with prior art wind deflectors. Finally, my wind deflector can be fabricated of tinted, polarized, or photosensitive material, or a combination thereof, to perform a dual function as a sun or glare shield.

My wind deflector also presents minimal interference with an operator's or a passenger's arm or elbow should the same be extended through the open window of the vehicle, such as when the open window sill acts as an arm rest, or when the arm is extended through the open window for signalling purposes. Thus, my wind deflector provides no hinderance to the convenient and safe operation of the vehicle. Finally, at least a portion of my wind deflector which attaches it to the vehicle door is fabricated of flexible material. Thus, it easily moves away when bumped by an occupant of the vehicle, and it is not liable to break loose and constitute a safety hazard during an accident.

2. Discussion of the Background of the Invention

From the earliest of days of passenger vehicles such as railroad cars and closed automobiles, it was quickly realized that it was necessary to allow the side windows of the vehicle to be opened. Thus, as the vehicle moves, the side windows provide fresh air and/or cooling breezes to enter. Even during a rain or snow storm, it has often proved desirable to at least "crack" the window partially open to provide fresh air. Unfortunately, the opening of a side window of a moving vehicle not only allows the fresh air and cooling breezes to enter the interior of the vehicle, but it also allows very annoying wind, drafts, rain, snow, smoke, exhaust fumes, dirt, dust, and/or insects to enter as well.

In the early days of railroading, the smoke and dirt from the burning of coal or wood fuel was unbearable to the passengers when the side windows of the passenger cars were opened during warm weather. However, when the windows were closed, especially in the summer, the buildup of solar heat in the closed vehicle was also unbearable. Therefore, the windows were allowed to be opened as the best compromise to such conditions.

With the advent of closed automobiles, the same problems appeared. The side windows were allowed to be opened during warm weather and during hand signalling, but the problem of the entry into the vehicle of annoying wind, cold drafts, rain, snow, smoke, exhaust fumes, dirt, dust, and/or insects continued, and continues even to this day.

Early on, wind deflectors were invented which were provided as part of the original equipment of the vehicle at the front of the side windows to partially overcome these problems. These wind deflectors, or pivoted "wings" as they were often called, did provide some solution to this problem. However, pivoted wings also present other problems which have never been satisfactorily solved. In the first place, they were relatively expensive and complicated to build and install, and thus, automobile manufacturers gradually eliminated them in all but the more expensive vehicles. Secondly, pivoted wings have a stodgy or old fashioned look about them which runs counter to the sleek, modern or sporty styling desired by the buying public. Thirdly, these wings, when extended, break up the air stream around the automobile, and add substantial wind resistance to the vehicle especially at highway speed. One need only extend his or her hand perpendicularly out of a vehicle at highway speed to feel this wind resistance. In these days which require an ever higher fuel economy for automobiles, anything which increases the wind resistance of the vehicle is undesirable. Moreover, a wind deflector which extends from the side of the vehicle can be easily broken when fully opened by obstructions passing too close to the side of the vehicle. Fourthly, pivoted wing wind deflectors were undesirable because they must be sealed by a rubber gasket when closed so as to prevent "whistling" and drafts at highway speeds. However, such gaskets can become misadjusted, worn, or otherwise misaligned so that the whistling and drafts continued. Finally, and probably most importantly, pivoted wings proved to be easily forced open by thieves without obviously damaging the window of the vehicle. Therefore, insurance companies exerted pressure on the vehicle manufacturers for their eventual elimination. As a result of all of these problems with pivoted wing deflectors at the front of a vehicle side window, there are virtually no passenger vehicles manufactured today which include them. Only some trucks and other large vehicles retain pivoted wing wind deflectors at the front of the side windows of such vehicles. Therefore, even though modern vehicles are designed in wind tunnels to minimize air resistance and to minimize entry of such wind, cold drafts, rain, snow, dirt, dust, and/or insects, these problems continue to exist when the side windows of the vehicle are opened.

As noted above, my wind deflector can be provided as a kit or add-on device for vehicles which do not have original equipment wind deflection provided. Other add-on devices for the front of the side window have been proposed by several aftermarket manufacturers over the years. Two such aftermarket front wind deflectors presently available are depicted in prior art FIGS. 1 through 3. Such wind deflectors are often bolted or screwed to the outside of the door frame as indicated in FIG. 1, or frictionally inserted between the cushion molding and the metal surround of the window as shown in FIGS. 2 and 3. These devices extend into the wind stream of the vehicle, are easily damaged or dislodged, are often model specific, and simply do not work very well. Thus, these devices do not solve the problems outlined above.

Besides placing the wind deflector at the front of the side window as described above, similar wing-type wind deflectors have also been placed at the rear of the side windows. Such wind deflectors have all the defects of the front wind deflectors, but also in some cases actually increase the drafts. For example, the U.S. patent to Dely, U.S. Pat. No. 1,677,711, issued Jul. 17, 1928, discloses a wing type of wind deflector at the rear of the side window which extends into the wind stream to actually increase the draft into the vehicle (page 1 thereof, lines 68–77). Other prior art patents which disclose similar pivotable wings or wind deflectors at the rear of side windows include the U.S. patent to Lang, U.S. Pat. No. 1,968,948, issued Aug. 7, 1934; the U.S. patent to Gillig in one embodiment (FIG. 6 thereof, and col. 4 thereof, lines 52–69), U.S. Pat. No. 2,534,348, issued Dec. 19, 1950; the U.S. patent to Helsley, U.S. Pat. No. 2,608,926, issued Sep. 2, 1952; and the U.S. patent to Wilfert, U.S. Pat. No. 2,790,675, issued Apr. 30, 1957.

Another variation of a wind deflector at the rear of the side window is disclosed in the U.S. patent to Sullivan, U.S. Pat. No. 1,960,601, issued May 29, 1934; and the U.S. patent to Zimmerman, U.S. Pat. No. 1,986,700, issued Jan. 1, 1935. These patents disclose technology which is very complicated, and actually amount to a vertically adjustable second window at the rear of the side window. Moreover, such a second window acting as a wind deflector would clearly interfere with the operator when his or her arm is extended for signalling, or when the operator attempts to use the window sill as an arm rest.

There are also several prior art patents which disclose subject matter similar to that disclosed and claimed herein as my invention. Nevertheless, each of these patents include defects which clearly render my invention superior in an unobvious manner as fully set forth below.

The first such patent is U.S. Pat. No. 2,242,606, to Duncan, issued May 20, 1941. In Duncan, a draft shield formed of glass (page 1 thereof, col. 1, lines 46–47) or sheet metal (page 1 thereof, col. 2, lines 36–40) is fitted to the back of the side window. Apparently, although it is not perfectly clear, Duncan's draft shield is mounted on the inside of the window. Duncan's shield includes a flange which extends along the top and back of the device. The flange is inserted into the socket between the window frame and the felt cushion that holds the window (page 1 thereof, col. 2, lines 5–9). Duncan's draft shield is said not to interfere with the operation of the window (page 1 thereof, col. 1, lines 6–8). However, it would appear to actually narrow the width of the window socket, and thus, to increase the friction between the window and the socket.

Duncan's shield is locked into place with a head or blade which is rotated by the manually adjusted eye. Once again, the blade would appear to interfere with the normal operation of the window. Also, although Duncan's device can be removed, each removal would force open the space between the flange and the window cushion and the blade and the window frame, making the device progressively more loose fitting. In contrast, as will be shown below, my device can be removed repeatedly without any such problem.

Another problem with Duncan is that it must be fitted for each specific automobile window, and is thus not readily adaptable as a general aftermarket device because too many different models of the shield must be made available. Moreover, since Duncan's shield extends the full height of the window, it would interfere with an operator's elbow or arm should it be desired to use the window sill as an arm rest or to extend the arm out of the open window for signalling purposes. Also, no pocket is formed to catch the draft as is disclosed and claimed in my device. Furthermore, in the embodiment where his shield is formed of sheet metal, it would clearly obscure the side vision of the vehicle operator. Finally, in the case of an accident, Duncan's device could be easily dislodged, break, and otherwise become a safety hazard to the occupants of the vehicle. For all of these reasons, the teachings of Duncan are not relevant to my disclosure.

The patent to Hamilton, U.S. Pat. No. 2,281,840, issued May 5, 1942, is similar to Duncan in that it discloses a wind deflector which is held in place at the back of the side window with tabs, that are forced between the window frame and the cushion molding of the window. The device is formed of molded glass, and thus, would be a safety hazard because it could be easily broken or dislodged in an accident. Clearly, the more often it is removed, the more easily it could be dislodged. Finally, like Duncan, the device must be formed to fit each specific window, and it requires the full height of the window. Therefore, it would be expensive to fabricate, it is unsafe, and it would interfere with the arm of the operator in the same way as the Duncan device.

The patent to Bryce, U.S. Pat. No. 2,573,396, issued Oct. 30, 1951, is also similar to Duncan in that it discloses a wind deflector which is held in place at the back of the side window by metal clamps or lugs which are turned and wedged between the window frame and the window cushion. This device could easily dislodge in an accident, it must be formed to fit each specific window, and it would interfere with the arm of the operator in the same manner as the Duncan device.

The patent to Gillig, U.S. Pat. No. 2,534,348, issued Dec. 19, 1950, identified and grouped above with pivoted wind deflectors at the rear of the side window, also includes an embodiment which is fixed (FIG. 2 thereof). This fixed embodiment is quite similar to Hamilton just described, and thus would have all of the defects that Hamilton has. Gillig's fixed deflector is apparently held in place solely by friction, and thus, would be even more dangerous in an accident. Finally, Gillig states (col. 1 thereof, lines 50–55) that his device does not interfere with the normal operation of the window or the latching and locking of the door. To the contrary, however, like Hamilton, the device is the full height of the window and would interfere with the operator's arm as described above. Secondly, as shown by FIG. 3 thereof, the flange along the bottom of Gillig's deflector would appear to interfere with the normal locking mechanism present on most vehicles despite Gillig's statement to the contrary.

The patents to Elsebusch, U.S. Pat. Nos. 2,465,345, issued Mar. 29, 1949, and 2,519,446, issued Aug. 22, 1950, are also similar to Hamilton and thus would have the same problems as Hamilton. Moreover, these devices are attached by screws into the window frame. Therefore, they are not easily added to existing vehicles like my deflector, nor would they be easily removable like mine.

The patent to Eaton, U.S. Pat. No. 2,696,154, issued Dec. 7, 1954, discloses, among other things, a rear wind shield or deflector in FIG. 1 thereof and shield in FIG. 8 thereof. Both of these shields are cut back at the bottom of the device to allow the arm or the elbow of the operator to extend through the window opening. Thus, these shields overcome the arm problems of Duncan, Hamilton, Bryce, Gillig, and Elsebusch described above. Nevertheless, this reference retains the problems of requiring a specific shield for each vehicle, and of being held by a friction flange between the door frame and the window cushion. Therefore, although Eaton solves one of the problems of the references cited above, it retains the other problems of those patents.

The patent to Furcini, U.S. Pat. No. 4,089,256, issued May 16, 1978, discloses a rear wind shield which is quite similar to that of Eaton in that it is cut back at the bottom of the shield to allow the arm or elbow of the operator to extend through the window opening. Thus, this patent also overcomes the arm problems of the other prior art patents cited above. Nevertheless, this reference requires a tapered flange along the top and the back of the shield, as shown in FIG. 7 thereof, which acts as a friction holding device between the window frame and the window cushion as shown in FIG. 2 thereof. Furcini also suggests the addition of an adhesive (col. 4 thereof, lines 31–34) to the edges of the shield to hold it in place. Thus, Furcini's shield is certainly not removable like my device. Finally, Furcini's requires a bead along the leading edge of the shield to rigidify it (col. 4 thereof, lines 45–48) which is an added expense to the fabrication process. Therefore, like Eaton, Furcini's solves the operator arm problem, but retains all of the other problems of the other prior art patents listed above, and adds further problems of its own which are not included or required in my device.

SUMMARY OF THE INVENTION

It is an object of the present invention to provide an apparatus for the deflection of wind, drafts, rain, snow, dirt, smoke, and/or insects from annoyingly entering the side window of a moving vehicle when the side window is opened, whereby fresh air is allowed into the vehicle without any of these annoyances.

It is also an object of this invention to provide such a wind deflector which will not interfere with the arm or elbow of an operator when the operator's arm is used for signalling, or when the operator's elbow is resting on the window sill of the vehicle.

It is a further object of this invention to provide such a wind deflector which is mounted inside of the vehicle at the rear of the side window, and which is adaptable to many different vehicles.

It is a further object of this invention to provide such a wind deflector which is easily removed from or reinstalled in the vehicle at the will of the operator without any special tools, without interfering with the normal operation of the window in any fashion, and which can be repeatedly installed and removed without deterioration of the mounting means.

It is a further object of this invention to provide a mounting for my wind deflector which is very secure, but which will easily move out of the way should the operator bump against it, and which will not be damaged in any way by such bumping. At the same time, my mounting means is such that it will not easily break loose in an accident causing possible injury to the occupants of the vehicle.

It is a further object of this invention to provide such a wind deflector formed of tinted, polarized, or photosensitive plastic, or a combination thereof, such that it can perform the dual function as a side sun or glare visor for the occupants of the vehicle.

Finally, it is an object of this invention to form a wind deflector which is easily fabricated of inexpensive materials such that the manufacturing costs are minimized, and whereby the necessity of providing many models of deflectors which are specific to a particular vehicle is largely eliminated.

These and other objects are achieved by attaching my wind deflector to the inside edge of the door frame with thistle and hook, i.e., VELCRO®, fastening material, or other comparable fasteners, which is further and even more securely held in place between the door jamb and the window frame when the door is shut.

BRIEF DESCRIPTION OF THE DRAWINGS

FIG. 6 is a plane view of a first embodiment of my wind deflector prior to installation. FIG. 7 is a plane view of a second embodiment of my wind deflector prior to installation.

FIG. 8 is a plane view of a third embodiment of my wind deflector prior to installation.

FIG. 9 is a perspective view from the outside of the vehicle with the window open showing the path of the air stream past the window with my wind deflector in place.

DESCRIPTION OF THE PREFERRED EMBODIMENT

Figure 1:
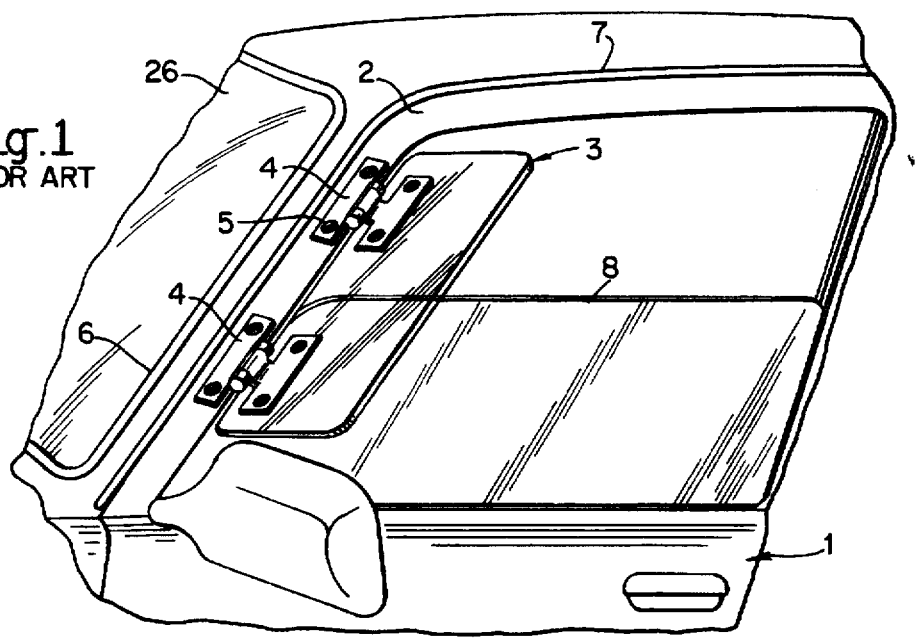
FIG. 1 is a view of one currently available prior art add-on wind deflector which is attached to the front outside of the side window of a vehicle. This wind deflector is generally ineffective, fragile, difficult to mount, and is not intended to be removable.

In the following, the present invention will be described in detail in conjunction with the exemplary embodiment thereof with reference to the accompanying drawings. Also, in the drawings, those elements of the prior art and those elements of the invention which are in common will be referred to by the same numbers.

Prior art FIG. 1 discloses a portion of a vehicle including the top part of the front side door 1. The front of the vehicle is toward the left side of the Figure. The door 1 is shown in the closed position. The door includes a window frame 2 at the top of the door provided in the conventional manner. The window frame 2 surrounds and supports the window 8 which is adjustable in the vertical direction to be fully closed, fully open, or somewhere in between as shown in the drawing. The front windshield 26 of the vehicle is shown held in place by the conventional molding 6. Around the periphery of the window frame is shown the typical roof drain 7.

The window of FIG. 1, as is conventional with modern vehicles, includes no original equipment factory installed wind deflection means. FIG. 1, however, discloses one example of a currently available aftermarket wind deflector 3 to be installed at the front of the side window 8. Wind deflector 3 is fabricated either of clear plastic or chrome plated metal, and it is attached to the window frame 2 by upper and lower hinges 4. The hinges 4 must be attached to the window frame 2 and to the wind deflector 3 by screws 5. Wind deflector 3 is difficult to install as an aftermarket device because the holes for the screws 5 must be drilled and tapped into the heavy metal of the window frame 2 by the installer. This is not necessarily an easy task for the average automobile owner. Moreover, wind deflector 3 would not be easily removed either, and if removed, leaves unsightly screw holes in the window frame. The hinges 4 in FIG. 1 are provided with high friction so when the wind deflector 3 is adjusted by the operator, it will stay in position. Since the hinges are of high friction, the plastic of wind deflector 3 is subject to much stress at the screw holes and is, thus, subject to cracking and breakage when being positioned by the operator or buffeted by the wind. On the other hand, if the wind deflector is made of metal, it is stronger, but it may obscure the side vision of the operator. Finally, as compared with my device, the wind deflector 3, which extends into the vehicle wind stream, is only marginally effective in performing its intended function.

Figure 2:
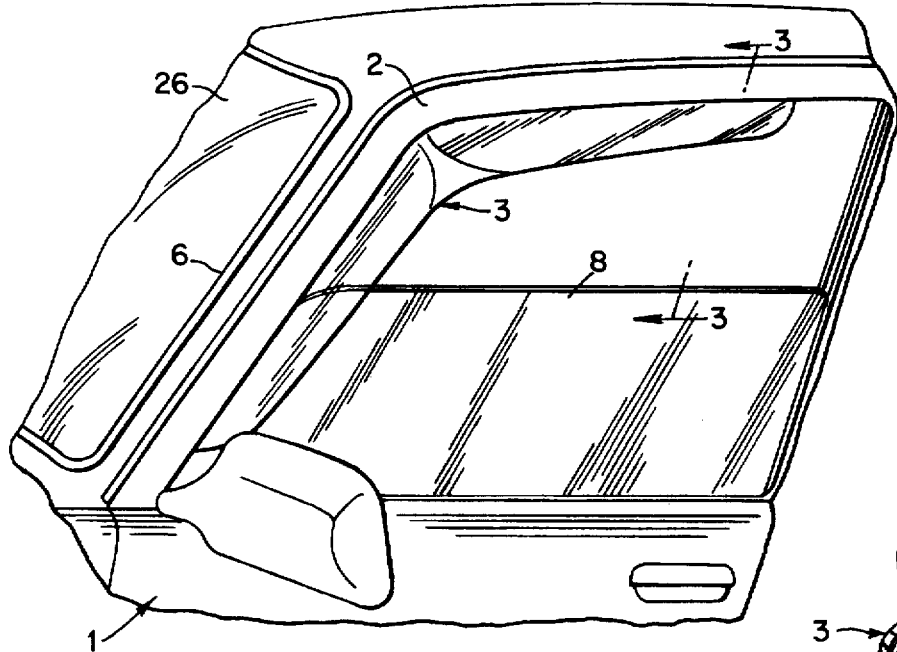
FIG. 2 is a view of another currently available prior art add-on wind deflector which is also attached to the outside front of the side window of a vehicle. This deflector is also generally ineffective, and it is only held in place by frictionally forcing a flange between the window cushion molding and the window frame.

Prior art FIG. 2 discloses another currently available example of a conventional aftermarket front wind deflector. As noted above, all elements in common with FIG. 1 are given the same number and their description remains the same. The wind deflector 3 is formed of either tinted plastic or chrome plated metal. It is installed by frictionally forcing an outer flange (element 10 in FIG. 3) between the window frame 2 and the window cushion 9. This installation is shown in detail in prior art FIG. 3, which is a sectional view taken along dotted line 3—3 in FIG. 2.

Figure 3:
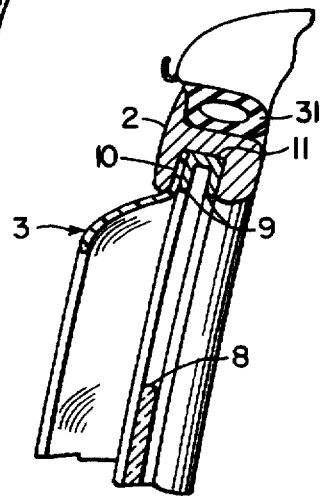
FIG. 3 is a sectional view of the prior art wind deflector of FIG. 2 taken along section line 3—3 in FIG. 2.

As indicated in prior art FIG. 3, the window 8 fits into the cushion molding 9 which is attached to an inner channel 11 in the window frame 2 as conventionally provided on the vehicle. The cushion molding 9 is snugly fitted and bonded into the channel 11 so that the window 8, especially when closed, will be firmly secured into the door frame without rattling or allowing any air to leak into or out of the closed vehicle. The weather striping 31 may be bonded to the window frame 2 or may be bonded to the door jamb depending on the particular vehicle.

As shown in FIG. 3, the wind deflector 3 includes a flange 10 which tightly fits between the side of the window channel 11 and the cushion molding 9. As is clearly evident, this wind deflector must be formed to fit a specific window which depends upon the size and shape of the window frame 2 and the size and shape of the window channel 11 and its cushion molding. This wind deflector, unless glued in place, would be easily dislodged, and it would appear to interfere with the smooth operation of the window since it squeezes the cushion molding 9 against the window. Finally, this wind deflector extends into the wind stream of the vehicle, and it only operates in a marginally effective manner as compared with my device.

Figure 4:
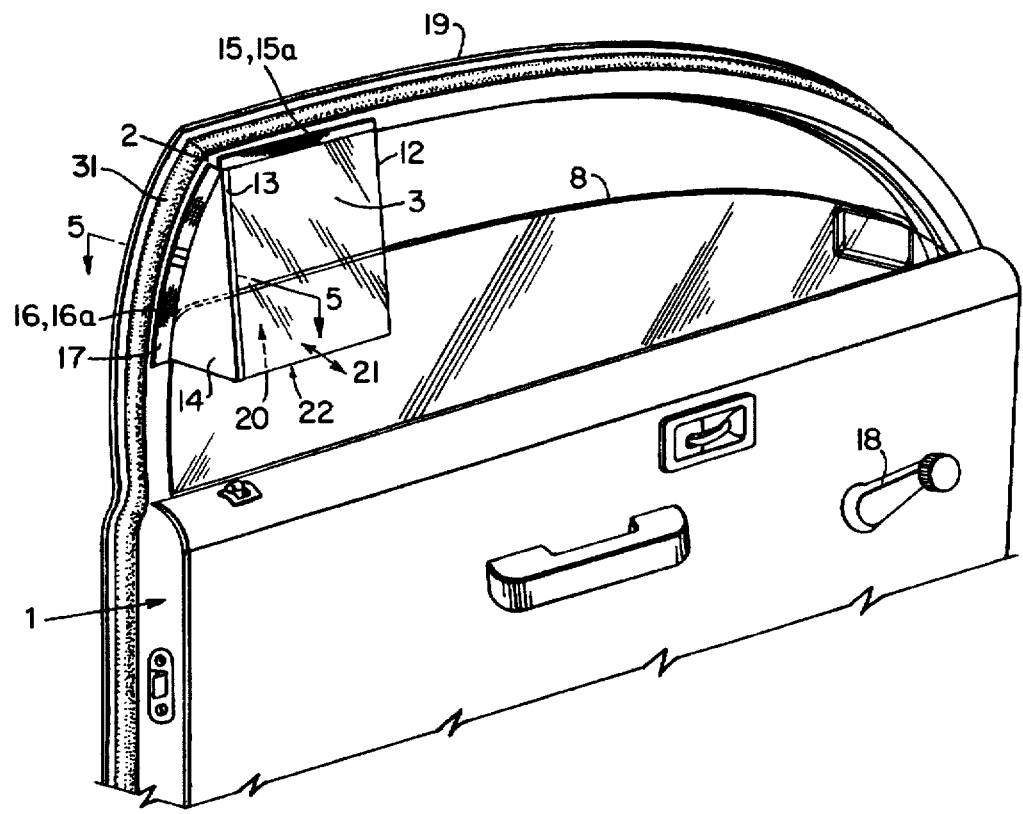
FIG. 4 is a prospective view of my wind deflector as installed.

FIG. 4 is a perspective view of the most simple embodiment of my invention as installed. As noted above, all elements in common with FIG. 1 are given the same number. The door 1 is shown open from the inside of the vehicle. The window frame 2 includes a top, generally horizontal portion, and a rear, generally vertical portion. The vertical rear element of the door window frame 2 is shown curved inwardly at the top to conform with the outer styling of the vehicle. Like FIG. 3, the weather stripping 31 is shown bonded to the window frame 2, but in many vehicles weather stripping 31 is bonded to the door jamb instead. Also, in some vehicles, the rear of the door window frame 2 can be straight rather than curved depending on the styling and outer contour of the vehicle. The sheet metal outer portion of the door is shown at 19. This sheet metal outer portion 19 is not provided on all vehicles. The conventional side window 8 of the vehicle is shown partially opened as controlled by the hand crank 18.

My wind deflector 3 is shown formed of a quadrilateral flat sheet 12, preferably of PLEXIGLAS®, which is bonded at its rear side edge 13 to a roughly triangular end piece 14 of any strong but flexible material such as TEFLON®. PLEXIGLASS® is a clear, relatively rigid, transparent plastic. TEFLON® is a tough, flexible, plastic material. Sheet 12 can be of other plastic materials as well. Flexible material 14 can be clear, translucent, or opaque as desired. Quadrilateral sheet 12 can be rectangular, square, or of other four-sided shapes dependent on the shape of the vehicle window. Square or rectangular shapes are suitable for most vehicles. Sheet 12 can be clear, but can also be tinted, polarized, include a photosensitive filter, or a combination of some or all of these characteristics so that the wind deflector 3 can also perform the dual function as a sun or glare shield.

At the top of sheet 12 of my deflector 3 is a strip 15 of VELCRO® which is bonded to the back side of the flat sheet 12. Similar VELCRO® strips 16 are also bonded to the back side of the outer edge 17 of the flexible end piece 14. These VELCRO® strips can be continuous along the full length of the top and back side of the wind deflector 3 as shown along the top at 15, or they can be in smaller spaced sections 16 as indicated along the edge 17 of flexible end piece 14. Also, see FIG. 7.

Complimentary VELCRO® strips 15a and 16a are bonded to the inside of the window frame 2 so that when the wind deflector 3 is mounted to the door, it is held in place by these complimentary VELCRO® fasteners. Such fasteners are also known as two-piece thistle and hook fasteners. Other comparable and equivalent fastening means besides this exemplary embodiment are also contemplated within the scope of my invention.

Figure 5:
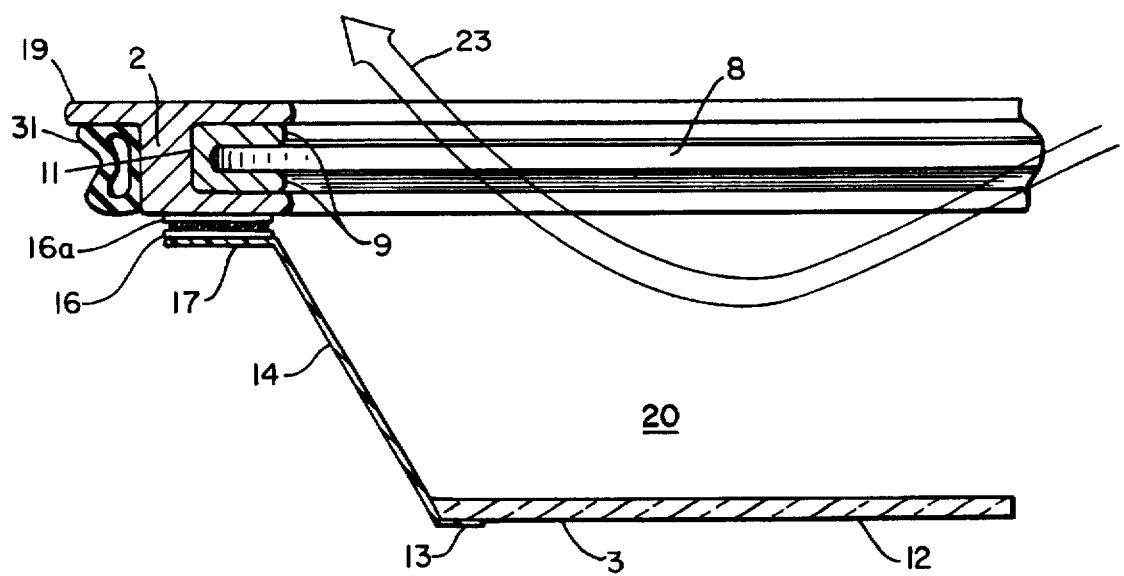
FIG. 5 is an enlarged top sectional view of my wind deflector taken along section line 5—5 in FIG. 4.

Sheet 12 hangs in an approximate vertical position when installed, although a perfectly vertical attitude is not required. Thus, the generally triangular flexible end piece 14, in combination with the vertical sheet 12, forms a pocket 20 between the plane of the side window 8 and the wind deflector 3. Pocket 20 is more clearly shown in sectional FIG. 5 which is a top cut-away view along section lines 5—5 in FIG. 4. FIG. 5 also shows generally the path of the wind 23 as it is trapped by the pocket and redirected out of the vehicle so that the drafts, etc., do not enter the vehicle.

The flexible end piece 14 also allows the wind deflector 3 to flex in and out as indicated by arrow 21, so that if or when the operator's arm or shoulder bumps into the wind deflector 3, it simply moves out of the way to prevent harm to the operator or the wind deflector. This is especially important when the vehicle is involved in an accident.

When the vehicle door is in a closed position (not shown), the VELCRO® fasteners are further squeezed between the window frame 2 and the door jamb of the vehicle. Thus, the wind deflector 3 is securely held in place when the vehicle door is closed, such that it will not pull loose as the other window deflectors described above may do. Needless to say, this is very important should the vehicle be involved in an accident. Moreover, with most vehicles, the VELCRO® mounting means is totally concealed by the inside cushion moldings around the door, so that no mounting is seen from the inside of the vehicle when the door is closed.

When the door is opened, however, my wind deflector 3 can be easily removed simply by pulling apart the VELCRO® fasteners 15-15a and 16-16a. However, the VELCRO® fasteners 15a and 16a remain on the window frame 2 permanently, so that my wind deflector can be easily reinstalled at any time. Moreover, even though fasteners 15a and 16a must remain on the window frame 2, they are not unsightly since, once again, they are usually concealed when the door is closed.

As indicated in FIG. 4, the bottom edge 22 of my wind deflector 3 does not extend down to the window sill, or in other words, the full height of the window. Thus, my window deflector does not interfere in any way with the arm or elbow of the operator when the operator is using the window sill as an arm rest or when the operator extends his arm through the window opening for the purpose of making hand signals. Also, since my wind deflector does not extend the full height of the window, it is not specific to any model of vehicle so that one size will fit a large number of different vehicles. This does not mean that my device is truly a one-size-fits-all product. However, only a relatively small number of variations of my device will fit almost any vehicle in service today, or any vehicle contemplated in the future. This is a far cry from other aftermarket wind deflectors which must be model specific, such that literally hundreds of different variations were required. It is probably for this reason that other similar aftermarket wind deflectors have never been commercially viable. Thus, my deflector is not only simple to make, it also solves all of the problems of the prior art described above.

FIG. 5 is an enlarged sectional view of FIG. 4 of my wind deflector 3 as viewed along section line 5—5. The sectional view 5—5 of FIG. 5 is similar to the prior art sectional view 3—3 of FIG. 3 except that it is viewed from the top. The conventional window frame 2 is shown in section from the top. Window frame 2 includes the standard socket channel 11, and within the socket channel 11 is the conventional window cushion 9. As with FIG. 3 above, window cushion 9 is designed to fit snugly, but resiliently, around the side and top edges of the window 8 as it slides Up and down to hold the window in place and to keep it from rattling and leaking air. As with FIG. 3, the weather stripping 31 can be bonded to the window frame 2, or it can be bonded to the door jamb (not shown), dependent on the vehicle.

As noted above, my wind deflector 3 is attached to window frame 2 by VELCRO® attachment means. Thus, bonded to the inside edge of the door frame is the VELCRO® strip 16a. This bonding is by any convenient adhesive which is strong enough such that the VELCRO® strip 16a can only be pulled loose from the window frame 2 with great effort. VELCRO® strip 15a (not shown in FIG. 5) is similarly adhesively attached along the top of the window frame 2 as indicated in FIG. 4.

As noted above, my wind deflector 3, besides the flat sheet 12, also includes an end piece 14 formed from a strong, flexible material such as TEFLON®. Flexible end piece 14 is bonded to the rear edge of the sheet 12 as indicated by seam 13. Seam 13 can be either an overlap bond around the outside of the sheet 12, an edge bond, or a bond along the inside of the sheet 12. Also, a mechanical bond can be provided if that is desired. Only the overlap bond at seam 13 is specifically shown in FIG. 5, but my disclosure in intended to cover any of these bonds. My bond is formed of any convenient adhesive or other attachment means which must be strong enough so that the flexible end piece 14 will usually tear before the bond can be broken.

The inside portion of the flexible end piece 14 is folded to form an edge 17. Edge 17 is bonded to the VELCRO® fastener 16 as indicated by FIG. 5. Fastener 16 is bonded to edge 17 with adhesive of the same strength as the bond 13 described above. As shown in FIG. 5, fastener 16 is mated with fastener 16a when my wind deflector 3 is attached to the window frame 2.

Although the window 8 and the sheet 12 are shown cutoff at the right-hand side of FIG. 5, it is clear that the space between the window 8, the sheet 12, and the flexible end piece 14 forms the pocket 20 as described above. The angle (unlabelled) between the sheet 12 and flexible end piece 14 can be equal to, less than, or greater than 90 degrees dependent upon the design of the vehicle just so long as an appropriate pocket 20 is formed. Thus, when the side window 8 of the moving vehicle is either fully or partially opened, the pocket 20 traps the wind stream indicated by the wide arrow 23, and redirects the majority of the wind stream back out of the vehicle. Therefore, the cold wind, drafts, rain, dirt, etc. are effectively blocked from entry into the vehicle. Nevertheless, enough of the air stream diffuses and softly leaks into the vehicle so that fresh air enters the vehicle without any of these annoyances. Should there be still too much air entering the vehicle, the operator can control this entry simply by raising the window several inches as desired.

FIGS. 6, 7, and 8 are plane views of my wind deflector as manufactured prior to installation in a vehicle. Flat sheet 12, of PLEXIGLAS® or other similar plastic material, forms the principal component of my wind deflector. Flat sheet 12 is of a convenient thickness such as ⅛ inches, but it can be of other thicknesses as well. Flat sheet 12 is relatively rigid, but may be somewhat flexible if desired to conform to any slight contour (See FIG. 10) of the vehicle window frame 2.

Figure 10:
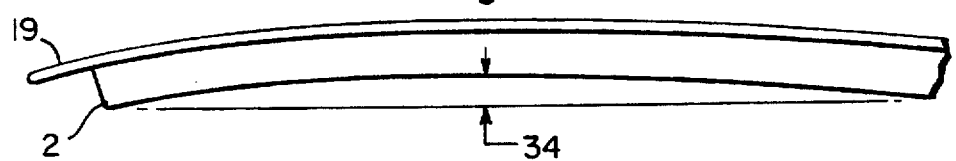
FIG. 10 is a downwardly directed view of an enlarged portion of FIG. 4 showing the slight contour in the upper rear, generally horizontal portion of the side window frame which can occur in some vehicles.

FIG. 10 is an enlarged downward view of the upper window frame 2 with the sheet metal outer portion 19. The portion of the window frame towards the front of the vehicle is shown cut-away. The contour is shown exaggerated to show the slight contour 34 that can occur in some vehicles.

If necessary, again dependent upon the design of the vehicle, the sheet 12 can be somewhat curved or take other forms as required. Alternatively, as shown in FIG. 8 and explained below, a further section of flexible plastic 27 of material similar to flexible sheet 14 can be bonded to the top of the flat sheet 12 as an additional aid in attaching the deflector to the vehicle door frame. As pointed out above, sheet 12 may be of clear, polarized, tinted, or photosensitive material or any combination of these characteristics. These characteristics can be continuous or can be graded (See FIG. 12) from top to bottom to provide more sun or glare prevention near the top of the sheet 12. The sheet 12 may be of one solid material, or may be a laminated structure. The polarization, tinting, or photosensitive characteristics may be incorporated throughout the solid material or may be incorporated by means of the laminated structure with the different laminates (See FIG. 11) giving the different characteristics.

Figure 11:
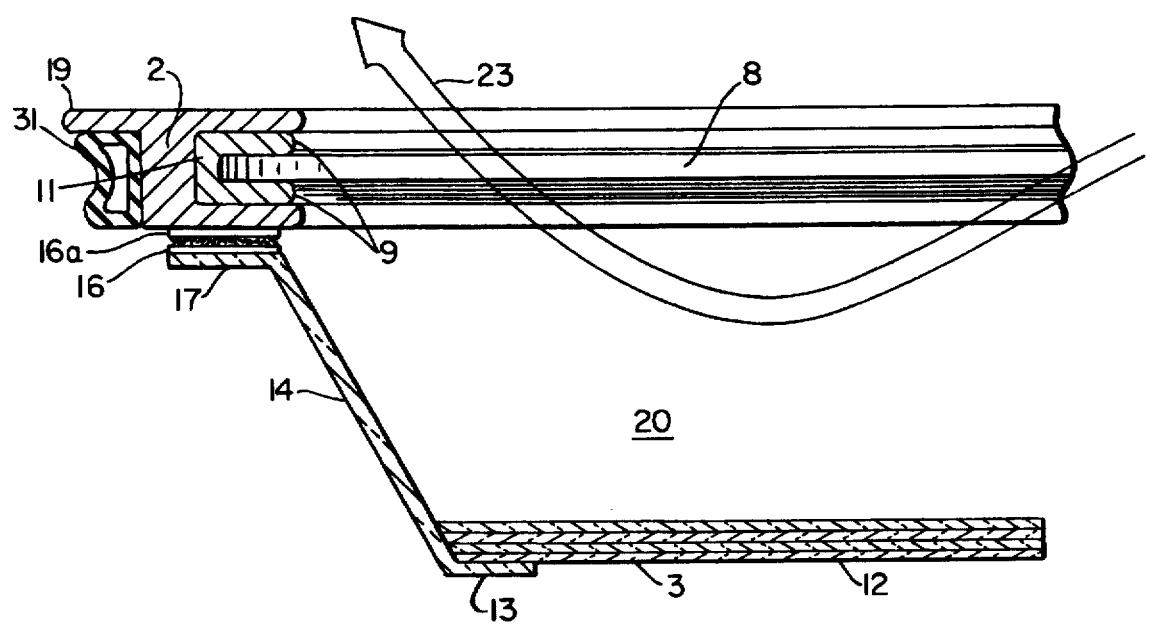
FIG. 11 is a variation of FIG. 5 showing the alternative structure of the flexible end piece being of transparent material, and the generally flat, generally quadrilateral, transparent sheet being formed of a laminated structure.

FIG. 11 is similar to FIG. 5 except that the sheet 12 is shown as a laminated structure incorporating as many of the separate characteristics as desired. Also, the flexible end piece 14 is shown as being transparent if that is desired.

Figure 12:
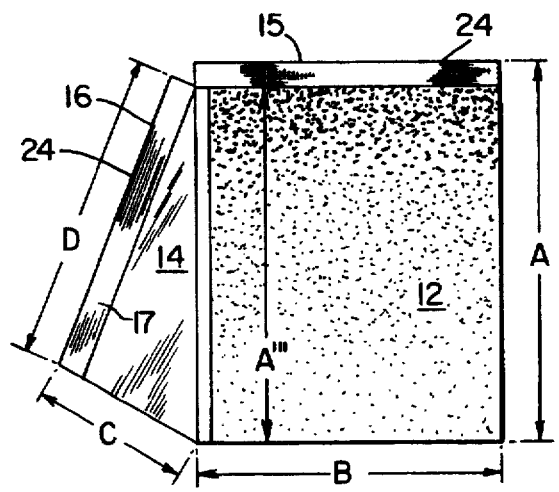
FIG. 12 is a variation of FIG. 6 showing the generally flat, generally quadrilateral transparent sheet being formed of graded tinted structure.

As shown in FIGS. 6, 7, 8, and 12, sheet 12 has a height A, A', or A" which is variable in length, dependent upon the height of the vehicle window. Similarly, the width B, B', or B" of sheet 12 is also variable. Finally, dimensions C, C', C", D, D', D", and E' of the triangular, flexible end piece 14 are also variable, but they are of sufficient width so that when the wind deflector is installed in the vehicle, the sheet 12 assumes an approximate, but not necessarily precise, vertical position as shown in FIG. 4 so that the pocket 20 is formed. If appropriate, the substantially triangular, flexible end piece 14 can be a right triangle with a height A'", a base C, and a hypotenuse D as shown in FIGS. 6 and 12. In FIG. 7, the flexible end piece can be substantially a right triangle with the base side C' and the hypotenuse side D'-E' being curved as shown to conform to the contour of the window frame. In FIG. 8, the flexible end piece is also substantially triangular in shape with its apex truncated as shown to form a trapezoid with a height A", a base C", and an outside edge D". Dimensions C, C', C", and D, D', D", and E' thus vary as a function of the length of the sheet 12, the amount of inclination of the door frame 2 (as shown in FIG. 4), and the width of the pocket desired. These variations are minor with only a relatively small number of variations of the dimensions A, A', A", B, B', B", C, C', C", and D, D', D", and E' fitting most vehicles presently available or contemplated in the future.

In FIGS. 6, 7, 8, and 12, the flexible end piece 14 is attached to the flat sheet 12 as indicated by the seam 13. Seam 13 is described in connection with FIG. 4, supra. The left-hand edge 17 of the end piece 14 can be folded when installed, and the VELCRO® strip 16 is bonded to the back side of the folded edge as shown in FIGS. 4 and 5 described above. The VELCRO® 15-16, as bonded to edge 17 and along the top of sheet 12, can be continuous along its full length, or it can be split into two or more sections as indicated by FIG. 7. By splitting fasteners 15-16 into two or more sections, any curve on the inside edge of the window frame 2 as indicated in FIG. 4 can be accommodated. The VELCRO® strip 15 is bonded on the upper back side of the flat sheet 12 as also described in connection with FIG. 4, supra. Finally, if necessary, a convenient weather seal 24 can be applied on the edges of the VELCRO® fasteners to prevent egress of water into or behind the fasteners.

FIG. 8 discloses another variation of my invention. The variation of FIG. 8 is essentially similar to FIG. 6 except that instead of the VELCRO® fastener 15 being bonded directly to the top of flat sheet 12, an additional flexible piece 27 is bonded along the top of sheet 12. Flexible piece 27 is generally rectangular in shape, or in conformance with the upper contour of the window frame dependent on the vehicle, and is formed of the same flexible material as side piece 14. The size of flexible piece 27 is indicated by the dimensions G" and H". VELCRO® fastener 15 is then bonded to the back top edge 29 of piece 27. Thus, additional flexible piece 27 allows the adaptation of my device to those vehicles that do not have a wide inside edge on its window frame 2. Thus, with FIG. 8, the VELCRO® fasteners 15a and 16a can be attached to the top or outside surface of the window frame instead of the inside edge. Also, flexible end piece 27 can be formed as a continuation of flexible piece 14 as indicated by section 30, which may or may not be cut out at the time of installation, again dependent on the vehicle. Thus, as shown in FIG. 8 and discussed above, end piece 14 can also be, for example, a truncated triangle, i.e., a trapezoid.

FIG. 8 also includes an optional extension 28 of sheet 12 when wind deflector is also being used as a sun or glare shield. With this option, it would be unnecessary to employ the fold down sun shield provided with the vehicle, which must be awkwardly pivoted to function as a sun or glare shield along the side window, and then repivoted when the driver or passenger exits the vehicle. However, with my invention in the embodiment of FIG. 8, the sun or glare shield automatically shifts out of the way when the door is opened. The size of extension 28 is indicated by dimensions E" and F" which again depend on the vehicle. Also, a beveled corner 32 can be provided to increase the strength of the extension 28 so that cracking at this corner will not result. Similarly, a beveled corner 33 can be provided at the lower corner of flat sheet 12 so that this sharp corner will not harm the arm of the vehicle operator or passengers. Clearly, this beveled corner 33 is also applicable to the other embodiments of FIGS. 6, 7, and 12.

FIG. 12 is similar to FIG. 6, in which the flat sheet 12 is shown tinted in a graded fashion from top to bottom wherein a deeper tint is at the top, and the deepness of the tint tapers off towards the bottom of flat sheet 12. This grading can be incorporated into any of the embodiments of my invention as desired or as required.

Finally, FIG. 9 discloses the pattern of the wind stream 23 around the side of the vehicle with the side window 8 open, and my wind deflector 3 installed. Without my wind deflector, the wind, drafts, rain, snow, dirt, etc. would be free to enter the vehicle freely causing all of the annoyances listed above. With the wind deflector 3 installed, the pocket 20 redirects the majority of the wind stream 23 back out of the vehicle. However, a small portion of the wind stream diffuses and leaks into the vehicle whereby fresh air still enters the vehicle as indicated by the downwardly depending arrow 25, but without the other annoyances entering. Surprisingly, even though my wind deflector is flexibly attached, the wind stream does not cause it to vibrate or flap about in any way, or cause a collapse of the pocket 20. Nevertheless, as discussed above, if the operator were to bump against the deflector, the attachment means is sufficiently flexible to move out of the way without hurting the operator or the wind deflector. As is also clear from FIG. 9, my wind deflector does not extend the full height of the window opening, and thus, would not impede the operator's arm or elbow in any manner. Accordingly, all of the defects and problems of the prior art are solved by my device.

Without further analysis, the foregoing so fully reveals the gist of the present invention that others can, by applying current knowledge, readily adapt it for various applications without omitting features that, from the standpoint of the prior art, fairly constitute essential characteristics of the generic and specific aspects of my contribution to the art, and therefore, such adaptions should and are intended to be comprehended within the meaning and range of equivalence of the appended claims.

I claim:

1. A wind deflector for a side window of a vehicle, said side window including a side window frame, said side window frame including an upper, generally horizontal portion and an upper rear, generally vertical portion, said wind deflector comprising:

a) a generally flat, generally quadrilateral, transparent sheet which forms a main structural member of said wind deflector;

b) said generally flat, generally quadrilateral, transparent sheet having a height and a width;

c) a generally flat, generally flexible end piece;

d) said generally flat, generally flexible end piece substantially forming a right triangle in shape, with a height edge substantially equal to said height of said generally flat, generally quadrilateral sheet;

e) a seam bonding said height edge of said generally flat, generally flexible end piece to a height edge of said generally flat, generally quadrilateral, transparent sheet;

f) one part of a first two-part fastener bonded to a top width edge of said generally flat, generally quadrilateral, transparent sheet;

g) one part of a second two-part fastener bonded to a generally hypotenuse edge of said generally flat, generally flexible end piece;

h) another part of said first two-part fastener attached to an upper rear, generally horizontal portion of said upper, generally horizontal portion of said side window frame of said vehicle; and i) another part of said second two-part fastener attached to the upper rear, generally vertical portion of said side window frame of said vehicle;

j) wherein when each of said one fastener parts are fastened to each of said other fastener parts, respectively, said wind deflector is installed forming a pocket between said side window and said generally flat, generally quadrilateral, transparent sheet;

k) said two-part fasteners being separable whereby said wind deflector can be installed or removed as desired.

2. The apparatus of claim 1, wherein said generally flat, generally quadrilateral, transparent sheet is rigid plastic.

3. The apparatus of claim 1, wherein said generally flat, generally quadrilateral, transparent sheet is relatively rigid plastic with sufficient flexibility to conform with a contour of said upper rear, generally horizontal portion of said side window frame when said wind deflector is installed.

4. The apparatus of claim 1, wherein said generally flat, generally quadrilateral, transparent sheet comprises tinted plastic to further act as a sun or glare shield when said wind deflector is installed.

5. The apparatus of claim 1, wherein said generally flat, generally quadrilateral, transparent sheet comprises polarized plastic to further act as a sun or glare shield when said wind deflector is installed.

6. The apparatus of claim 1, wherein said generally flat, generally quadrilateral, transparent sheet comprises photosensitive plastic to further act as a sun or glare shield when said wind deflector is installed.

7. The apparatus of claim 1, wherein said generally flat, generally quadrilateral, transparent sheet comprises tinted, polarized, or photosensitive characteristics comprising a laminated structure, with each lamina of said laminated structure possessing one or more of said tinted, polarized, or photosensitive characteristics to further act as a sun or glare shield when said wind deflector is installed.

8. The apparatus of claim 1, wherein said generally flat, generally quadrilateral, transparent sheet comprises tinted, polarized, or photosensitive characteristics, wherein one or more of said tinted, polarized, or photosensitive characteristics is continuous throughout said generally flat, generally quadrilateral, transparent sheet to further act as a sun or glare shield when said wind deflector is installed.

9. The apparatus of claim 1, wherein said generally flat, generally quadrilateral, transparent sheet comprises tinted, polarized, or photosensitive characteristics, wherein said tinted, polarized, or photosensitive characteristics are graded from top to bottom to further act as a variable sun or glare shield when said wind deflector is installed.

10. The apparatus of claim 1, wherein said generally flat, generally quadrilateral, transparent sheet includes a lateral, additional elongated portion comprising tinted, polarized, or photosensitive characteristics at said top width edge to further act as a glare shield along an extended width of said side window.

11. The apparatus of claim 10, wherein said lateral, additional elongated portion includes a beveled portion joining said generally quadrilateral, transparent sheet to strengthen said joining.

12. The apparatus of claim 1, wherein said generally flat, generally flexible end piece comprises strong, but flexible, soft plastic which may be clear, translucent, or opaque.

13. The apparatus of claim 1, wherein said first and second two-part fasteners are thistle and hook fasteners.

14. The apparatus of claim 1, further comprising an additional piece of strong, but flexible, soft plastic bonded to said top width edge of said generally flat, generally quadrilateral sheet, wherein said one part of said first two-piece fastener is bonded to a top of said additional piece of strong, but flexible, soft plastic as a further aid in installing said wind deflector as required by said vehicle.

15. The apparatus of claim 14, wherein said additional piece of strong, but flexible, soft plastic is a continuous extension of said generally flat, generally flexible end piece.

16. The apparatus of claim 1, wherein said height of said generally flat, generally quadrilateral sheet, and said height edge of said generally flat, generally flexible end piece are of substantially equal length which is less than a height of said side window whereby an arm or elbow of a vehicle operator or passenger is free to extend out of the vehicle without interference when said wind deflector is installed.

17. The apparatus of claim 1, wherein said generally flat, generally quadrilateral sheet includes a bevel at a lower front corner to further minimize interference with an arm or elbow of a vehicle operator or passenger when said wind deflector is installed.

18. The apparatus of claim 1, wherein said generally flat, generally flexible end piece has a shape which is configured to accommodate different vehicles.

19. A pocket wind deflector for a rear portion of a side window of a vehicle comprising:

a) a relatively rigid, flat, quadrilateral sheet which forms a main structural member of said wind deflector;

b) a flexible end piece;

c) said flexible end piece being generally triangular in shape including a base edge, a height edge, and a hypotenuse edge;

d) a seam bonding said height edge of said flexible end piece to a side edge of said relatively rigid, flat, quadrilateral sheet;

e) one or more two-piece fasteners attaching a top portion of said relatively rigid, flat, quadrilateral sheet of said pocket wind deflector to an upper rear surface of a window frame surrounding said side window;

f) one portion of said one or more two-piece fasteners being bonded to said upper rear surface of said window frame, and another portion of said one or more two-piece fasteners being bonded to an upper back edge of said relatively rigid, flat, quadrilateral sheet; and g) one or more further two-piece fasteners that attach said hypotenuse edge of said flexible end piece to a rear side surface of said window frame;

h) one portion of said one or more further two-piece fasteners being bonded to said rear side surface of said window frame, and another portion being bonded to said hypotenuse edge of said flexible end piece;

i) said two-piece fasteners being separable whereby said wind deflector can be installed or removed as desired by an operator of said vehicle;

j) whereby said wind deflector when installed forms a pocket such that when said side window is lowered, a substantial portion of a wind stream which would normally enter said vehicle when moving is redirected back out of said vehicle.

* * * * *